Feb. 21, 1939.  R. W. CARLSON  2,148,013
STRESS METER
Filed March 2, 1936
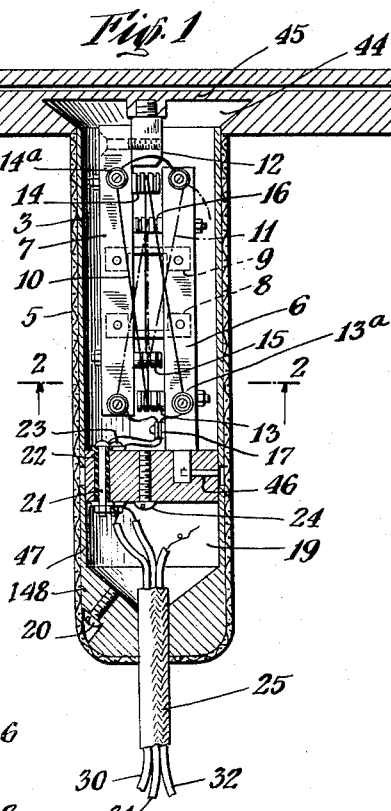
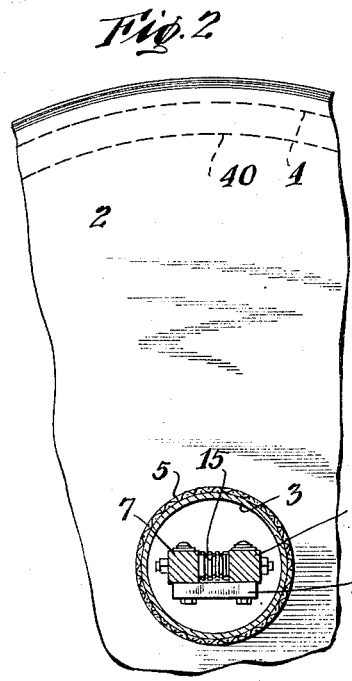
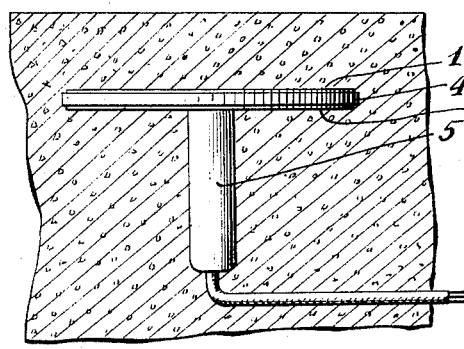
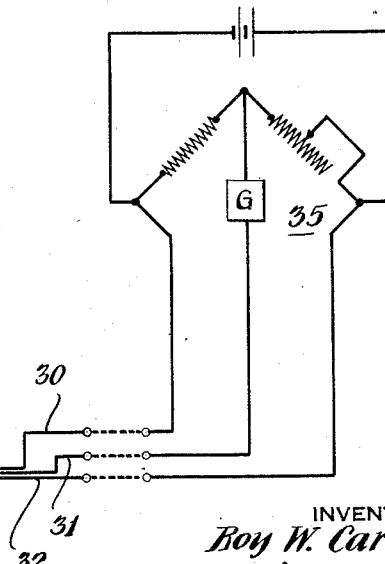
INVENTOR
*Roy W. Carlson*
BY *Chester F. Carlson*
ATTORNEY Patented Feb. 21, 1939

2,148,013

UNITED STATES PATENT OFFICE 2,148,013

STRESS METER

Roy W. Carlson, Berkeley, Calif.

Application March 2, 1936, Serial No. 66,651

12 Claims. (Cl. 73—51)

This invention relates to stress measuring devices.

An object of the invention is to produce an improved device for measuring compressive stresses or pressures.

Other objects of the invention will be apparent from the following description and accompanying drawing taken in connection with the appended claims.

In one of its forms the invention may be embodied in a stress measuring device or meter for determining stress within solids or fluids, including bonded integral bodies such as concrete and also other masses, such as earth, sand, gravel or other materials. The device may preferably comprise means for converting the stress effects into variations which can be measured electrically, and associated electrical means for indicating or recording the magnitude of said variations.

The invention accordingly comprises the features of construction, combination of elements, arrangement of parts, and methods of manufacture referred to above or which will be brought out and exemplified in the disclosure hereinafter set forth, including the illustrations in the drawing, the scope of the invention being indicated in the appended claims.

For a fuller understanding of the nature and objects of the invention as well as for specific fulfillment thereof, reference should be had to the following detailed description taken in connection with the accompanying drawing, in which;

Figure 1 is a section of a stress meter according to the present invention, taken in a plane perpendicular to the stress responsive member thereof;

Figure 2 is a section on the line 2—2 of Figure 1;

Figure 3 illustrates the meter embedded in a mass of concrete in position for use; and Figure 4 is a diagram of a simplified electrical measuring circuit therefor.

Like reference characters denote like parts in the several figures of the drawing.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

The difficult problem of measuring compressive stresses in concrete and other solidified materials has not heretofore, to my knowledge, been satisfactorily solved. Solidified concrete may be subject to a variety of chemical and physical changes which may introduce errors into the measurements unless the stress meter is made non-responsive to all these changes except compressive stress. Let us consider a block of concrete similar to that shown in section in Figure 3. Shortly after the concrete is poured it begins to set and after a few hours time it is a relatively rigid solid block. Hardening of the concrete continues indefinitively, however, first rapidly and then more gradually, the hardness increasing for years at a slower and slower rate. During preliminary setting and hardening a great deal of heat is generated by the chemical actions taking place resulting in a very marked raising of the temperature of the concrete and consequent volume expansion of the block.

As the rate of chemical action associated with hardening becomes slower the concrete begins to shrink due both to cooling and also frequently to drying out, especially at the surface. Since cooling and drying take place first at the surface these layers shrink the most rapidly resulting in a certain amount of compressive stress being applied to the internal mass of concrete. As the temperature and moisture content tend to equalize this internal stress is altered but probably never entirely disappears.

If an external load is applied to the concrete block, by placing it in a compression testing machine, for example, a compressive stress will be present throughout the concrete mass in the direction in which the load is applied. Similar stresses occur in structures such as dams, bridge foundations and buildings due to the pressure of water or the weight of superstructure or of live load.

A satisfactory stress meter should indicate no stress due to the uniform volume expansion of the concrete or the uniform shrinkage resulting from uniform cooling and drying. It should, however, give an accurate indication of the compressive stress in the interior of a concrete body due to surface shrinkage, to applied loads, or to any other factors causing stress.

Referring to the drawing, a stress meter suitable for measuring compressive stress in concrete, soil and other bodies is illustrated and comprises a stress responsive part, means for converting stress variations in this part into definite variations in electrical resistances and an electric measuring circuit for converting the variations in resistance into corresponding changes in an indicating or recording instrument.

The stress responsive part comprises a circular steel disc or diaphragm 1 and a machined circular steel plate 2 welded together at the circumferential edges so that the plate and diaphragm are spaced slightly to provide a thin disc-shaped chamber 4 between them. Plate 2 has a circular groove 40 cut in its edge, this groove extending rather deeply into the plate so as to provide a thin flexible portion 41 connecting the main body of plate 2 to diaphragm 1. A small hole 42 in plate 2 provides access to the chamber 4, a small steel screw 43 being provided for sealing the hole. Chamber 4 is completely filled with a liquid, such as mercury.

A small diaphragm 45, forming a part of the wall of chamber 4, is created by providing in the outer face of plate 2 a central circular recess 44.

The means for converting the variations into electric resistance variations, comprising a cylindrical telemeter member, is secured to plate 2 at the center and periphery of diaphragm 45. An anchoring block 12 is screwed or otherwise connected to a boss at the center of diaphragm 45 and rectangular bar or frame member 7, forming part of the telemeter member, is secured thereto.

Cylindrical metal case 3 is welded or soldered around the circumference of one of its ends to the edge of recess 44 in plate 2 and extends perpendicularly to plate 2 enclosing frame member 7 which is parallel to the axis of case 3 but eccentric thereto. Cylindrical metal block 46 is fitted into case 3 at the free end thereof and is welded or soldered to the case around its circumference to provide a closed chamber within case 3. A second bar or frame member 6 similar to bar 7 is anchored in block 46 and extends parallel to bar 7 on the opposite side of the axis of case 3.

The frame members 6 and 7 support a pair of coils 10 and 11 of taut steel piano wire arranged and supported in a manner similar to that set forth in my co-pending application, Serial Number 738,457, filed August 4, 1934, for Telemetric device, now Patent 2,036,458, issued April 7, 1936.

Spacing members in the form of flat metal springs 8 and 9 aid in maintaining the spaced relation between bars 6 and 7. The planes of the springs are normally perpendicular to the axis of the case and the springs may preferably have enlarged ends whereby they may be rigidly secured to the bars 6 and 7. Thus they allow the bars a limited relative movement lengthwise due to their elasticity, but effectively prevent a relative movement of the bars in any other manner.

The coils 10 and 11, of small wire or filament, are mounted within the case between bars 6 and 7. Coil 10 is wound over insulating spools 13 and 14 formed of rigid insulating material such as porcelain or glass. Spool 13 is mounted on the inner face of bar 6, and spool 14 on the inner face of bar 7, spool 13 being relatively near block 46 and spool 14 being considerably nearer member 12. Thus deflection of diaphragm 45 due to increased pressure on the mercury within chamber 4 will cause a decrease in separation of spools 13 and 14 and thereby decrease the tension on the strands of coil 10.

Coil 11 is wound on insulating spools 15 and 16 of smaller diameter. Spools 15 and 16 are mounted on the inner faces of bars 7 and 6, respectively, between spools 13 and 14. Thus the deflection of diaphragm 45 will cause spools 15 and 16 to increase in separation and thus increase the tension on the strands of coil 11. Both coils are secured at their ends to binding posts projecting from bars 6 and 7, but insulated therefrom. Coil 10, for example, is secured to binding posts 13a and 14a.

Since the spools supporting inner coil 11 are of smaller diameter than those supporting coil 10 the coils do not interfere or make contact with each other. The coils are, however, so close to each other that any external temperature variations will ordinarily affect them both to the same extent. It is desirable that the dimensions of the device be so proportioned and the number of turns of the coils be so related that approximately the same length of wire is on each coil.

A sealing chamber 19 is provided for an electric cable terminal at the free end of case 3. This case may be constructed, for example, by boring out a cylindrical piece of metal and leaving the dome-shaped end wall 148.

For outside circuit connections to the coils insulated cable 25 passes through a hole in dome 148 into chamber 19. Cable 25 carries three wires 30, 31, and 32 which are connected to individual machine screws 21 passing through block 46 from the inside of the case. Screws 21 are insulated from the block by sleeves 22. Conductors 23, within the case 3, connect the screws 21 to the ends of coils 10 and 11, one of the conductors serving as a common lead for both coils.

Conductors 23 may be covered with a suitable insulation, such as enamel, for example, and they may be held in position by a block of insulation 17.

In assembling the telemeter member the inside framework is first put together. Coil 11 is then wound over the inside spools and clamped at its ends. The tension of all the strands is adjusted until they are all equally stressed as indicated by similar tones when the separate strands are plucked with the fingers.

Coil 10 is next wound about its spools and a weight is hung from the free end of this coil after which the tensions of the strands are adjusted. All terminals are soldered, and wires 23 and cable 25 are soldered to the proper binding posts. Case 3 is placed in position and is then soldered or welded to members 2 and 46.

After assembly case 3 may be filled with a suitable insulating liquid, such as castor oil, or a high viscosity mineral oil, for example, through the oil filling hole in member 46. The oil may preferably be introduced while hot after which screw 24 is screwed tightly into the oil filling hole, thus closing case 3. As the hot liquid in case 3 cools a small vacuous space is formed within the case thus allowing for volume changes due to changes in temperature and to deflection of the diaphragm. In some instances it may be desirable to leave out part or all of the oil and introduce instead nitrogen gas, preferably at low pressure to minimize internal pressure variations.

Sealing chamber 19 is attached by screw threads or by soldering and is filled with a solidifying, insulatory sealing compound.

Before filling chamber 4 it is tested for leakage under both internal and external gas pressure and then evacuated and filled with mercury while the air is exhausted. After testing to insure the absence of any occluded gas within the diaphragm, it is sealed with a small screw 43. The telemeter unit is calibrated in terms of deflections, partly as a check on the design calculations, but mainly to be sure that it is operating in its useful range. When the stress meter is completely assembled, it is placed in a pressure chamber and simultaneous observations of pressure and resistance ratio of the wires of the telemeter unit are made.

A simplified circuit arrangement for indicating the ratio of the resistance of coils 10 and 11 is shown in Figure 4. This circuit is preferably used during calibrating as well as during subsequent stress measurements. The measuring equipment may be enclosed in a suitable portable case if desired or it may be otherwise mounted. Conductor 30 is connected through cable 25 to a terminal of coil 10, conductor 31 is connected to a terminal common to both coils 10 and 11 and conductor 32 is connected to the remaining terminal of coil 11. With connections as shown Wheatstone bridge circuit 35 (Fig. 4) is used for the measurement of the resistance ratios of the coils. By disconnecting conductor 31, connecting conductor 32 to the galvanometer G in its stead and adding a fixed resistance in the remaining arm of the bridge, the combined series resistance of the coils 10 and 11 can be measured, thus permitting the determination of temperature at the instrument as described in my above identified copending application.

Before embedding the stress meter in concrete or other masses a strip of tape or other yielding material 48 is wrapped around the periphery of the stress responsive unit including diaphragm 1 and plate 2 so as to cover groove 40. This prevents the groove 40 from filling with concrete and also prevents the concrete from producing heavy transverse stresses in the diaphragm. The bullet-shaped telemetric member is preferably covered with a fabric sock 5 before embedding to prevent any bonding of concrete thereto and consequent distortion of the instrument. The telemetric unit produces the effect of a void in the concrete and since its sectional area is usually relatively small (of the order of one square inch or less, for instance) errors resulting from its presence are not believed to be serious.

In operation the unit is placed in the concrete during casting, or is embedded in soil or other materials the internal stress of which is to be measured, care being taken to insure contact of both faces of the diaphragm member with the material. Any stresses developed across the plane of the diaphragm will increase the pressure on the mercury in chamber 4. This increased pressure, in turn, will cause a deflection of diaphragm 45 proportional to the stress. This causes a variation in the relative tension on coils 10 and 11 thereby varying the ratio of their resistances. This ratio is measured by Wheatstone bridge circuit 35, thereby giving a reading of the stress. Bridge 35 may be provided with a recording meter if desired so that a graph of the variations in stress may be made.

As has been brought out in part above, the principal requirements for a satisfactory stress measuring device are:

1. Independence from the effect of volume changes due to causes other than load,
2. Independence from the effect of temperature changes,
3. Remote reading, and
4. The rigidity, or stress-strain diagram, of the device must be approximately equal to that of the material in which it is to be embedded.

The first requirement is fulfilled by making the area of the diaphragm large in comparison with its thickness. Then if the device is embedded in concrete, for example, and the concrete shrinks, only a slight compression will be imposed on the diaphragm and the concrete will warp around the device the minute amount necessary to preserve equilibrium of forces. In the device here described the area is preferably more than 50 square inches and the thickness is not more than one half inch. Furthermore, the groove provided at the periphery of the diaphragm permits the device to warp slightly with the concrete and thus does not interfere with the concrete seeking its natural deflection curve around the device, which does not shrink. In fact, it is sometimes desirable to facilitate the warping further by surrounding the diaphragm with a ring of compressible material, increasing the total load thrown on the diaphragm slightly, but making the device more completely independent of volume changes.

The second requirement is obtained by making the diaphragm of a material having a coefficient of thermal expansion nearly equal to that of the concrete or other surrounding material, and by making the telemeter member substantially free from temperature effects. The diaphragm is preferably made of steel which has almost the same thermal expansion as concrete, and the telemeter member has almost no temperature correction, especially when it is made of steel wire and has a steel frame.

The third requirement is easily achieved by making the conductor wires from the telemeter member as long as necessary to reach a suitable point for taking readings.

The fourth requirement is met by making the small diaphragm 45 of the proper thickness to make the effective rigidity of the device as a whole equal to that of the surrounding material. In other words the modulus of elasticity of the device should be equal to that of the surrounding material.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A stress measuring device comprising a pair of spaced parallel plates, said plates being relatively movable toward and away from each other, a peripheral wall defining a chamber between said plates, a liquid filling said chamber, a flexible diaphragm in the center of one of said plates and in contact with said liquid, and deflection measuring means associated with said diaphragm for measuring deflections thereof.

2. A stress measuring device comprising a first plate, a second plate parallel thereto and spaced therefrom, a flexible wall joining said plates around their periphery, a liquid enclosed between said plates, a flexible diaphragm in one of said plates in contact with said liquid and means for measuring the deflection of said diaphragm.

3. A stress measuring device comprising a first plate, a second plate parallel thereto and spaced therefrom, a flexible wall joining said plates around their periphery, mercury enclosed between said plates, a flexible diaphragm in one of said plates in contact with said mercury and means for measuring the deflection of said diaphragm.

4. A stress measuring device comprising a first circular plate, a second circular plate parallel thereto and spaced closely thereto, a flexible flange on the edge of said first plate, said flange being secured to said second plate around the outer edge thereof, a liquid enclosed between said plates, a flexible diaphragm in one of said plates in contact with said liquid and means for measuring the deflection of said diaphragm.

5. A stress measuring device comprising a first circular plate, a second circular plate parallel thereto and spaced closely thereto, a flexible flange on the edge of said first plate and a nonflexible flange also on the edge of said plate, said flexible flange being secured to said second plate around the outer edge thereof, a liquid enclosed between said plates, a flexible diaphragm in one of said plates in contact with said liquid and means for measuring the deflection of said diaphragm.

6. Means for measuring the compressive stress within a body of concrete, soil or the like, comprising a device adapted to be embedded therein, said device including a pair of spaced parallel plates, a flexible member joining said plates around the periphery thereof, a liquid enclosed between said plates, a flexible diaphragm in one of said plates and electrical means associated therewith for measuring the deflection of said diaphragm.

7. A stress measuring device for measuring the compressive stress within solid bodies comprising a pair of spaced plates, a liquid confined therebetween and pressure measuring means for measuring the pressure on said liquid, said means comprising a pressure responsive diaphragm in contact with said liquid, and a telemetric device for measuring the deflection of said diaphragm, said telemetric device comprising a first anchoring member secured to said diaphragm, a second anchoring member, a first and second wire, frame means to maintain a tension on each of said wires, said frame means being connected to said anchoring members and said wires so as to increase the tension on said first wire and to decrease the tension on said second wire responsive to relative motion of said anchoring members in one direction and conversely responsive to relative motion of said anchoring members in the opposite direction.

8. A stress measuring device comprising a first circular plate, a second circular plate parallel thereto and spaced closely thereto, a flexible flange on the edge of said first plate, said flange being secured to said second plate around the outer edge thereof, a liquid enclosed between said plates, a flexible diaphragm in one of said plates in contact with said liquid and means for measuring the deflection of said diaphragm comprising a first anchoring member secured to said diaphragm, a second anchoring member secured to said plate carrying the diaphragm, a first and second wire, frame means to maintain a tension on each of said wires, said frame means being connected to said anchoring members and said wires so as to increase the tension on said first wire and to decrease the tension on said second wire responsive to relative motion of said anchoring members in one direction and conversely responsive to relative motion of said anchoring members in the opposite direction.

9. A stress measuring device for measuring the compressive stress within coherent solid bodies comprising a pair of spaced plates, a liquid confined therebetween and means associated with said liquid for measuring the hydrostatic pressure thereof, said plates and confined liquid comprising an assembly which affords substantially the same resistance to compressive forces normal to the outer faces of said plates as does the surrounding material of the solid body within which said device is embedded.

10. A stress measuring device for measuring the compressive stress within coherent solid bodies comprising a pair of spaced plates, a liquid confined therebetween, a diaphragm of substantially smaller area than the area of said plates, said diaphragm having one of its faces in contact with said liquid, and means for measuring the deflection of said diaphragm, said plates and confined liquid comprising an assembly which affords substantially the same resistance to compressive forces normal to the outer faces of said plates as does the surrounding material of the solid body within which said device is embedded.

11. A stress measuring device for measuring compressive stress within a solid body comprising a flat unit having a thickness which is small in comparison with its lateral extent, said unit being adapted to be embedded in said body so as to be placed under compression by pressure of the surrounding material of said body against its two opposite faces, an electrical resistance element associated with said unit and means for applying a stress to said resistance element responsive to the application of the compression to said unit, whereby the electrical resistance of said element is altered by the compression, the effective modulus of elasticity of said unit with respect to compressive forces normal to its two opposite faces being substantially equal to the modulus of elasticity of the material of said solid body.

12. A stress measuring device for measuring the compressive stress within a solid body of concrete comprising a flat unit having a thickness which is small in comparison to its lateral extent, said unit comprising a pair of spaced plates, a peripheral wall defining a chamber between said plates, mercury filling said chamber and means for measuring the hydrostatic pressure thereof, said peripheral wall being sufficiently flexible to allow slight relative movement of said plates toward or away from each other, said unit being adapted to be embedded in said concrete prior to solidification thereof so as to be placed under compression by pressure of the surrounding concrete against its two opposite faces when the concrete has become solid and the effective modulus of elasticity of said unit with respect to compressive forces normal to its two opposite faces being of the same order of magnitude as the modulus of elasticity of solid concrete.

ROY W. CARLSON.